UNITED STATES PATENT OFFICE.

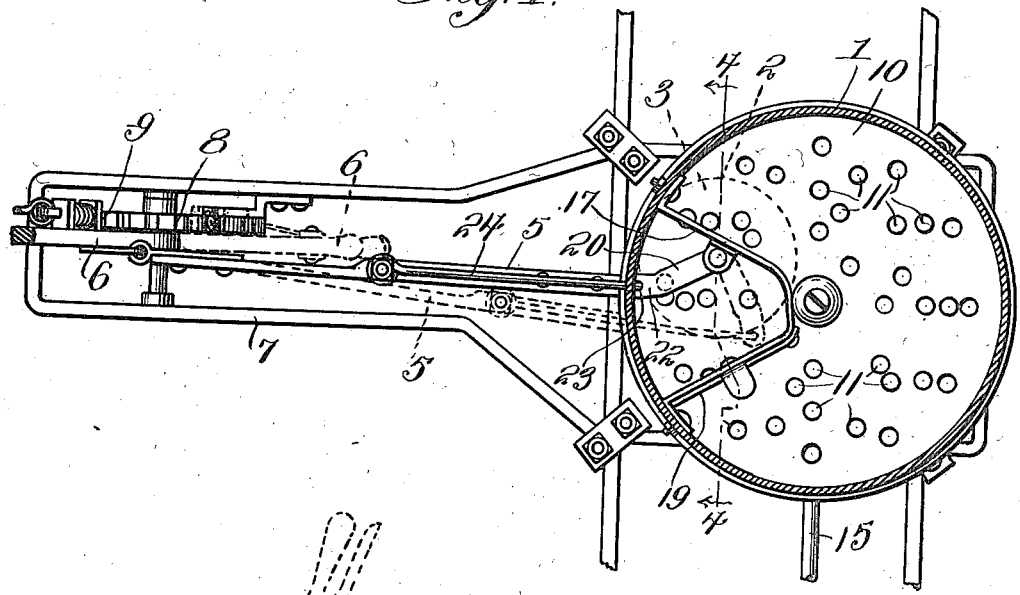
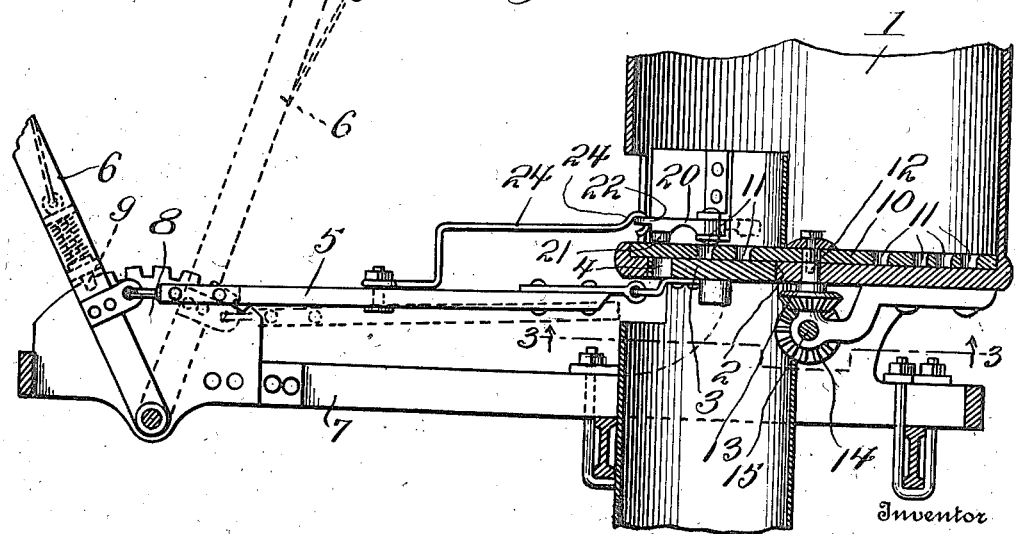

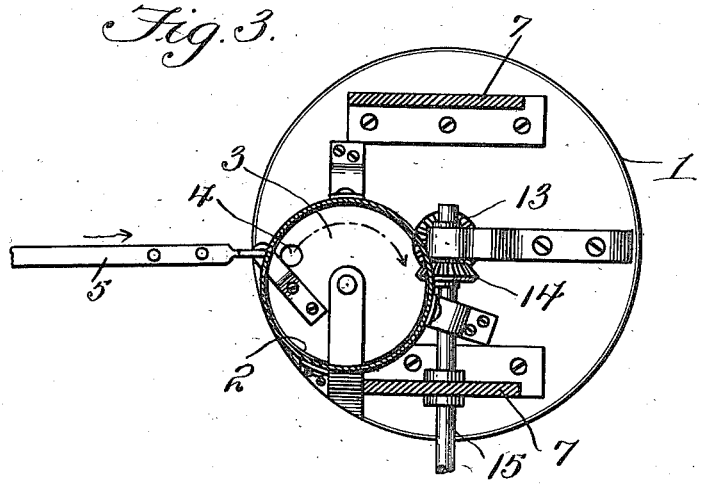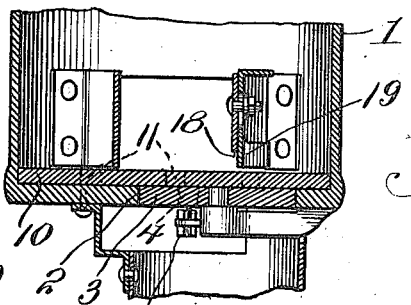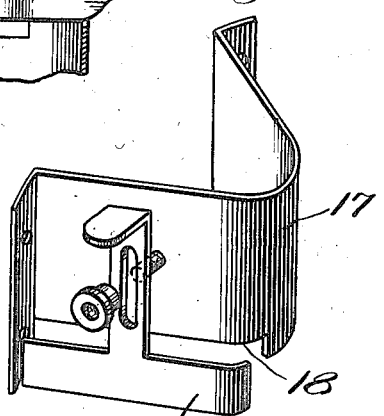

SCOTT A. HASTIN, OF BENTON, KENTUCKY.

PLANTER.

1,209,576.

Specification of Letters Patent.

Patented Dec. 19, 1916.

Application filed June 24, 1916. Serial No. 105,623.

*To all whom it may concern:*

Be it known that I, SCOTT A. HASTIN, a citizen of the United States, residing at Benton, in the county of Marshall and State of Kentucky, have invented new and useful Improvements in Planters, of which the following is a specification.

This invention relates to planters especially adapted to be used for planting corn, peas and the like, and it consists in the novel features hereinafter described and claimed.

An object of the invention is to provide a seed dropping mechanism for a planter with means for readily adjusting the same to vary the rate of speed at which the said dropper operates. In other words the parts of the mechanism may be readily adjusted to deposit the seed at intervals arranged from twelve to thirty two inches apart.

With this object in view the planter comprises a hopper having a partition located therein with an opening at one side thereof. A gate is adjustably mounted upon the partition and may be shifted to increase or diminish the passage way through the said opening. A plate is turnably mounted in the lower portion of the hopper and is provided with several series of apertures the said apertures of each series being arranged in circular lines upon the plate. The bottom of the hopper is provided with an opening in which a disk is turnably mounted. The said disk is provided with an aperture which is adapted to be moved under one of the lines in which one of the series of apertures in the plate is located. A knocker is pivotally mounted in the hopper between the side walls of the partition and is movable simultaneously with the said disk whereby the end portion of the knocker is always maintained in vertical alinement with the aperture in the disk and lies over the line of the active apertures in the plate. Suitable means are provided for shifting the disk and knocker simultaneously.

In the accompanying drawings:—Figure 1 is a top plan view of the seed dropping mechanism. Fig. 2 is a sectional view of the same. Fig. 3 is an under view of the same. Fig. 4 is a sectional view of the same cut on the line 4—4 of Fig. 1. Figs. 5 and 6 are detailed perspective views of parts of the same.

As illustrated in the accompanying drawings, the hopper 1 may be of conventional pattern and the same is provided in its bottom with an opening 2. The said opening 2 is located at one side of the center of the bottom of the said hopper. A disk 3 is turnably mounted in the opening 2 and the disk is provided in the vicinity of its periphery with an aperture 4. A rod 5 is pivotally connected at one end with the underside of the disk 3 at a point beyond the center thereof and the outer end of the said rod is pivotally connected with a lever 6 which is suitably fulcrumed upon the frame 7 which supports the hopper 1. A dentate segment 8 is mounted upon the frame 7 adjacent the lever 6 and the said lever is provided with a spring pressed pawl 9 adapted to engage the notches of the segment 8 whereby the lever 6 is held at an adjusted position with relation to the said segment. A plate 10 is turnably mounted in the hopper 1 and the said plate is provided with several series of apertures 11, the said apertures being arranged in circular lines concentric with the center of the plate 10. The series of apertures 11 are arranged at different distances from the center of the plate 10 and inasmuch as the said series include different numbers of apertures the said apertures are not in radial alinement with relation to the center of the said plate. The plate 10 is mounted upon a shaft 12 which is journaled in the bottom of the hopper 1 and a beveled pinion 13 is carried at the lower end of the said shaft and meshes with a similar pinion 14 mounted upon a shaft 15 which is journaled in the frame 7. Any suitable means (not shown) may be provided for rotating the shaft 15.

A partition 17 is located in the hopper 1 with the major portion of its lower edge in contact with the upper surface of the plate 10. The said partition 17 is provided at one side with a recess 18 which serves as a passage way to permit the seed to pass under the partition and within the opposite sides thereof. A gate valve 19 is slidably mounted at that side of the partition 17 which is provided with the recess 18 and the said valve 19 is slidable vertically and its lower portion is adapted to be moved over the recess 18 whereby the passage way through the said recess may be increased or diminished as desired. A knocker 20 is pivotally mounted between the sides of the partition 17 and the said knocker carries at its free end a head 21 which is located just above the upper surface of the plate 10.

An angularly disposed arm 22 is mounted upon the upper side of the knocker 20 and the said arm in turn is provided with an opening 23 which receives an angularly disposed end of a rod 24 attached to the rod 5.

In operation the lever 6 is swung whereby the rods 5 and 24 are moved longitudinally and the disk 3 and knocker 10 are turned whereby the aperture 4 and the head 21 are positioned at the opposite side of the line of one of the series of apertures 12. As the plate 10 rotates the seed is carried from the intermediate portion of the hopper 1 through the recess 11 and the seed falls into the apertures 11 which are between the side walls of the partition 7. As the plate 10 continues to rotate, the seed, which is carried in the apertures 11, which move over the aperture 4 in the disk 3, fall through the said aperture and are directed by suitable chutes carried by the planter into the furrow in the soil.

In view of the fact that the series of apertures 11 vary in number and the apertures of the different series are at different distances apart it is apparent that by shifting or turning the disk 13 the aperture 4 thereof may be brought into alinement with any particular series of apertures 11 and hence the rate of speed at which the seed is deposited may be varied. Also the intervals between the droppings may be varied in order that the seed may be deposited in the soil at intervals arranging from twelve to thirty two inches apart.

From the foregoing description taken in connection with the accompanying drawing it will be seen that a seed dropping mechanism for a planter of simple and durable structure is provided and that the same may be readily manipulated to vary the rate of speed at which the seed is deposited.

Having described the invention what is claimed is:—

1. A seed dropping mechanism comprising a hopper provided with an opening located in its bottom, a disk turnably mounted in the opening and having an aperture, a plate turnably mounted in the hopper and provided with several series of apertures, an arm, a knocker pivotally mounted in the hopper above the plate and having an end portion vertically above the apertures in the disk and means for turning the disk and knocker simultaneously.

2. A seed planting mechanism comprising a hopper provided with an opening located in its bottom, a disk turnably mounted in said opening and having an aperture, a plate turnably mounted in the hopper and having several series of apertures, a partition located in the hopper above the plate and having a recess located at one side, a knocker pivoted in the hopper between the sides of the partition and means for turning the knocker and disk simultaneously.

3. A seed dropping mechanism comprising a hopper having an opening located in its bottom, a disk turnably mounted in the said opening and having an aperture, a plate turnably mounted in the hopper and provided with several series of apertures, a partition located in the hopper above the plate and having a recess provided at its side, a gate shiftably mounted upon the partition and adapted to increase or diminish the passage way through the said recess, a knocker pivoted between the sides of the said partition, and means for turning the knocker and disk simultaneously.

4. A seed dropping mechanism comprising a hopper having an opening located in its bottom, a disk turnably mounted in said opening and having an aperture, a plate turnably mounted in the hopper and having several series of apertures, a knocker turnably mounted in the hopper and provided at its free end with a head which is in alinement with the aperture in the disk and means for turning the knocker and disk simultaneously.

5. A seed planting mechanism comprising a hopper having an opening located in its bottom, a disk turnably mounted in the opening and having an aperture, a plate turnably mounted in the hopper and provided with several series of apertures, a knocker pivotally mounted in the hopper, an angularly disposed arm carried by the knocker, a rod connected with the disk, an operating lever connected with said rod, means for holding the said lever at an adjusted position and a rod connecting the first mentioned rod with the said knocker.

In testimony whereof I affix my signature.

SCOTT A. HASTIN.

Attest:
L. E. WALLACE,
H. L. GRIFFITH.